No. 749,903. PATENTED JAN. 19, 1904.
R. E. OLDS.
BRAKE MECHANISM.
APPLICATION FILED MAR. 1, 1902.
NO MODEL.
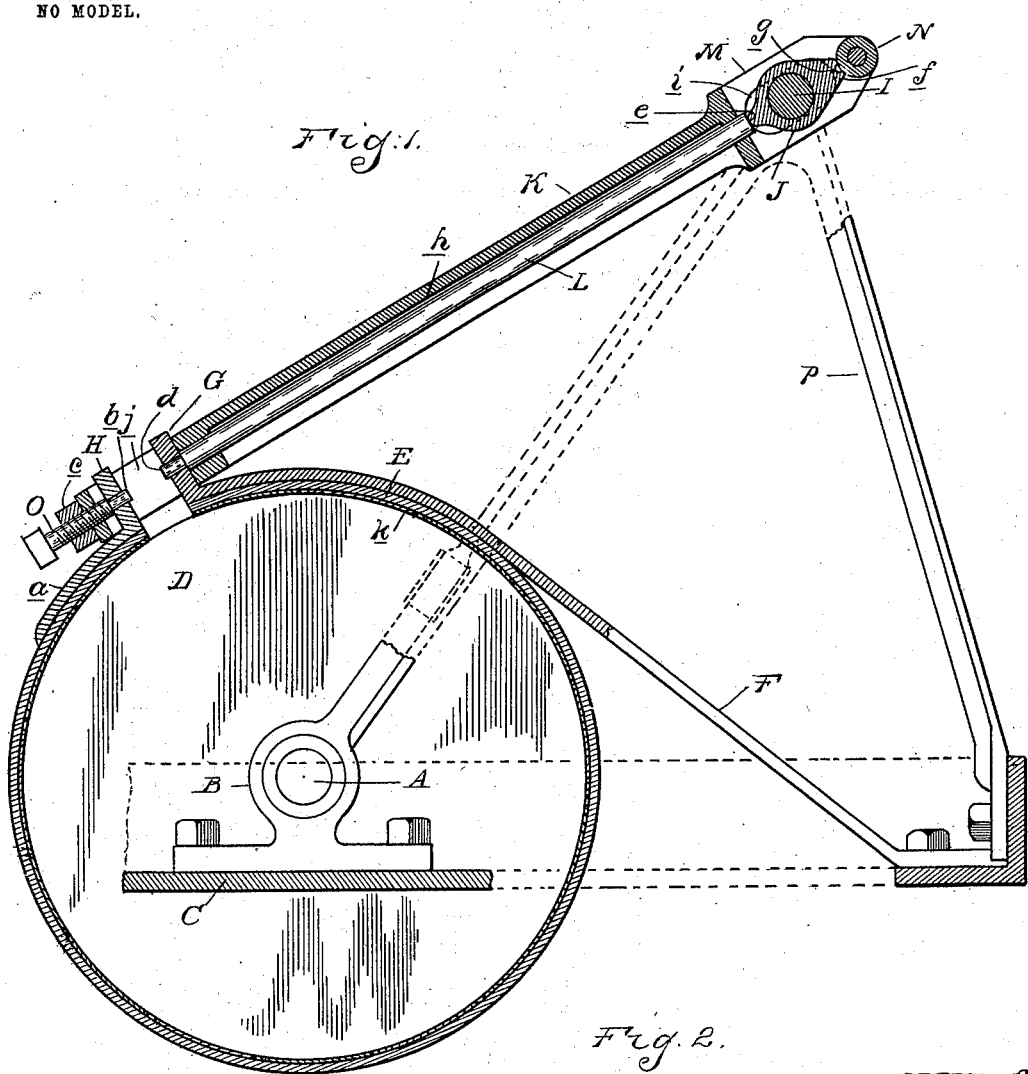
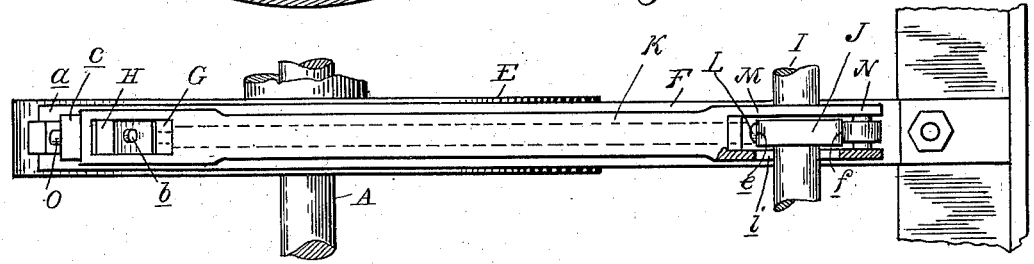
Inventor
Ransom E. Olds No. 749,903. Patented January 19, 1904.

UNITED STATES PATENT OFFICE.

RANSOM E. OLDS, OF DETROIT, MICHIGAN, ASSIGNOR TO OLDS MOTOR WORKS, OF DETROIT, MICHIGAN, A CORPORATION OF MICHIGAN.

BRAKE MECHANISM.

SPECIFICATION forming part of Letters Patent No. 749,903, dated January 19, 1904.

Application filed March 1, 1902. Serial No. 96,256. (No model.)

*To all whom it may concern:*

Be it known that I, RANSOM E. OLDS, a citizen of the United States, residing at Detroit, in the county of Wayne and State of Michigan, have invented certain new and useful Improvements in Brake Mechanism, of which the following is a specification, reference being had therein to the accompanying drawings.

The invention relates to brake mechanism more especially designed for use in connection with transmission-gearing for motor-vehicles, &c. With transmission-gearings of the type frequently employed for this purpose different driving speeds are imparted to the mechanism by alternatively arresting the movement of a plurality of heads sleeved upon the driving-shaft. These heads are connected to said driving-shaft by differential gearing and are also directly or indirectly connected to the driven member. Thus when one of the heads is arrested the driven member will be rotated through one train of gearing, and when the said head is released and another head arrested a different drive-train will be employed.

The invention consists in the construction of a peripheral brake for said heads, together with mechanism for applying and releasing said brake, as will be more fully hereinafter described and claimed.

In the drawings, Figure 1 is a vertical cross-section through the brake mechanism. Fig. 2 is a plan.

A is a drive-shaft which is journaled in suitable bearings, such as B, upon the framework C.

D is one of the heads sleeved upon the shaft A and connected therewith either directly or by suitable intermediate gearing. (Not shown.)

E is a brake-strap surrounding the periphery of the head D and having its opposite ends approaching within a short space of each other.

F is an arm to which one end of the strap E is attached and which at its opposite end is secured to the frame C. The outer end of the arm F is bent to extend substantially radially from the head D, so as to form a lug G. The opposite end of the brake-strap E is also provided with an outwardly-projecting lug H, corresponding to the lug G, and which is secured to said strap by suitable means, such as by the flange *a*. The lugs are adapted to be moved from and toward each other by the following mechanism: I is a rock-shaft having secured thereon the cam J. K is an arm or connection extending from the shaft I to the lugs H and G and embracing the latter. L is a rod slidingly secured in the arm K and extending between the cam J and lug G. The arm K is also provided with a portion M, which embraces the shaft I and carries an antifriction-roll N, adapted to bear against the cam J. At the opposite end of the arm K is a set-screw O, which is adapted to bear against the lug H and is preferably provided with a pintle *b*, engaging with an aperture in said lug. This set-screw is provided with a locking-nut *c* for holding it in different positions of adjustment. The sliding rod L is also provided with a pintle *d*, engaging with an aperture in the lug G. The arrangement of parts just described is such that when in the rotation of the shaft I the cam J is moved to separate the roll N and sliding rod L the lugs G and H will be thereby moved toward each other, so as to cause the strap E to be tightly drawn around the head D. The arm F is so arranged in relation to the lugs G and H that when said lugs are moved toward each other said arm F will flex laterally to permit of said movement. At the same time as the direction of movement of the head D is as indicated by the arrow the arm F will form an anchor which will rigidly resist any rotation of the strap E caused by the friction of the head. The spring of the metal in the arm F is sufficient to normally hold the same in a position where the brake-strap is held slightly out of contact with the head D.

The cam J is preferably formed with the oppositely-projecting portions *e* and *f*, the former being adapted to bear against the end of the rod L and the latter against the roll N. In order to hold the cam in a position where the brake-strap is applied to the head D, the lug *f* is preferably notched, as at *g*, so as to engage with the roll N. Thus whenever the cam J is turned into the position shown in Fig. 1 the notch $g$ will tend to hold the cam from rotation until it is positively actuated by the movement of the shaft I. The shaft I is journaled in suitable bearings secured to the frame C, preferably by means of a triangular frame P, one member of which extends upward from the bearing for the shaft A and another member from the forward portion of the frame C. The frame P thus forms a truss, which will hold the shaft I in fixed relation to the shaft A and will resist any strain caused by the application of the brake. The member K is preferably of the form shown, having the central portion $h$ thereof hollow or channel-shaped to receive the sliding bar L. The portion M is preferably bifurcated to embrace the cam J, and each furcation is provided with a longitudinally-extending slot $i$, through which the shaft I passes. At the opposite end of the member K is a yoke $j$, which embraces both of the lugs G and H and has a threaded aperture therein for receiving the set-screw O.

The brake-strap E is preferably provided with shoes or lining-blocks $k$, as shown.

From the above description it will be understood that when the brake-strap is released the strap E will be suspended from the arm F, so as to be entirely free from the head. As soon, however, as the shaft I is rocked to turn the cam J into the position shown in Fig. 1 the lugs G and H will be moved oppositely and will draw both ends of the strap E, so as to tightly apply the same. As the arm F extends tangentially from the brake-strap, only a tension strain will be thrown thereon by the friction of the head.

What I claim as my invention is—

1. The combination with a revoluble head, of an arm extending from a fixed support tangentially into proximity to the periphery of said head and continuing around a segment thereof in the direction of rotation, a flexible strap secured to the segmental portion of said arm and extending around said head, the opposite end of said strap being in proximity to the end of said arm, two slidably-connected rods respectively secured to the ends of said strap and arm and extending tangentially therefrom at an angle to the tangential member of said arm and means for moving said rods oppositely to tighten said strap.

2. The combination with a revoluble head, of an arm extending from a fixed support tangentially into proximity to the periphery of said head, and continuing around a segment thereof, terminating in an outwardly-extending ear, a flexible strap connected to the segmental portion of said arm, encircling said head and terminating in an ear in proximity to the ear on said arm, a rock-shaft, a sliding arm having yokes at opposite ends thereof respectively embracing said ears and said rock-shaft, a rod slidingly secured to said yoke-rod, and bearing at one end against the ear on said arm and a cam on said shaft intermediate said sliding rod and the bearing on said yoke, said cam being adapted to move said rods oppositely to tighten the strap.

3. The combination with a revoluble head, of a peripheral brake-strap therefor having its opposite ends in proximity, an anchor for said strap permitting of a limited movement of both ends thereof, a rock-shaft at one side of said head, a cam thereon, a member extending from the ends of said brake-strap to said shaft having a bifurcated end embracing said cam and the furcations thereof longitudinally slotted for the passage of said shaft, an antifriction-roll secured between said furcations beyond said cam, a rod slidably engaging said member with its outer end on the opposite side of said cam from said roll, and oppositely-arranged bearings at the inner ends of said rod and member adapted to engage with the ends of said brake-strap, substantially as and for the purpose described.

4. The combination with a revoluble head, and a brake-strap therefor having its opposite ends in proximity, of an operating connection for tightening said strap comprising two slidably-connected members respectively connected to said ends of the strap, and one of said members being bifurcated at its outer end, a rock-shaft passing through slots in the furcations a cam on said shaft between said furcations adapted to bear against the end of the other slidable member, an antifriction-roll secured between said furcations on the opposite side of said cam, adapted to bear thereon, said cam being provided with oppositely-projecting portions respectively adapted to engage with said roll and the end of the other slidable member and the former being notched to form a locking engagement with the roll.

In testimony whereof I affix my signature in presence of two witnesses.

RANSOM E. OLDS.

Witnesses:
HENRY E. HOOKER,
WM. H. HUMPHREY.